H. L. BOCK.
ROLLER THRUST BEARING.
APPLICATION FILED JULY 16, 1912.

1,177,596.

Patented Apr. 4, 1916.

WITNESSES:
W. K. Ford
James P. Barry

INVENTOR
Henry L. Bock

BY
Whittemore Hulbert Whittemore
ATTORNEY

UNITED STATES PATENT OFFICE.

HENRY L. BOCK, OF TOLEDO, OHIO, ASSIGNOR TO WILLIAM EMIL BOCK, OF TOLEDO, OHIO.

ROLLER THRUST-BEARING.

1,177,596.  Specification of Letters Patent.  Patented Apr. 4, 1916.

Application filed July 16, 1912. Serial No. 709,737.

*To all whom it may concern:*

Be it known that I, HENRY L. BOCK, a citizen of the United States of America, residing at Toledo, in the county of Lucas and State of Ohio, have invented certain new and useful Improvements in Roller Thrust-Bearings, of which the following is a specification, reference being had therein to the accompanying drawings.

The invention relates to roller thrust bearings, and it is the object of the invention to obtain a construction in which all contacting portions of the rolls are in true rolling contact with the coöperating surfaces, and further to obtain a self centering construction.

Figure 2:
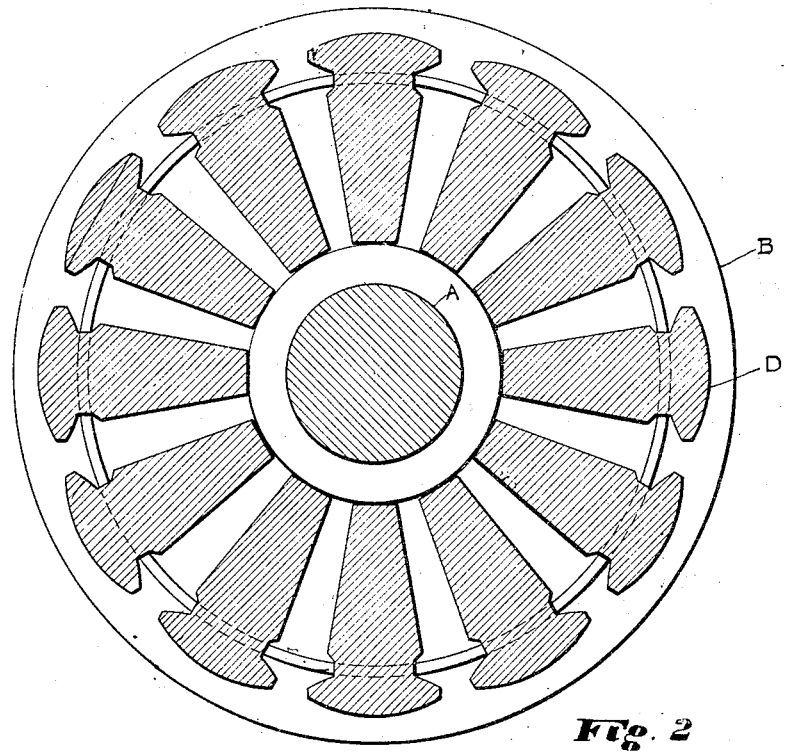
Figure 1:
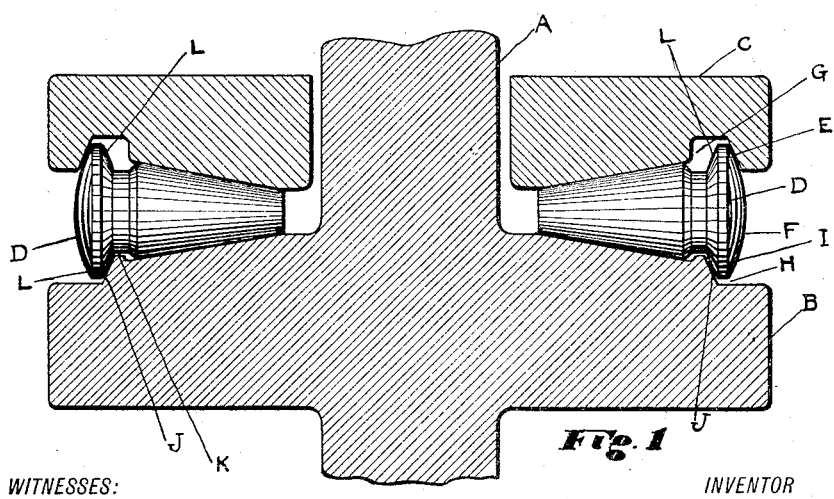

In the drawings: Figure 1 is a longitudinal section through the bearing; and Fig. 2 is a transverse section therethrough.

A is a rotatable member such as a shaft and B is a head or flange thereon for transmitting the end thrust to a non-rotating or differential rotating member C. The members B and C are provided with conical bearing surfaces converging to a common point in the axis of the rotatable member, and between these surfaces are arranged corresponding conical rolls D. Thus if the rolls are maintained in concentric series and radial relation to the axis of the rotatable member, their surfaces will be in true rolling contact with the members B and C.

To resist outer displacement of the rolls by the wedging action of the surfaces C and D thereupon, one of the members such as C is provided with a surface E for engaging the outer end of each roll. The rolls are also provided at their outer ends with enlarged heads F, which engage grooves or cut-away portions G and H in the members B and C. The outer surface I of the head F is spherical, and the relative arrangement of the same with respect to the surface E is such that the two surfaces will be tangent to each other, the point of tangency lying in the intersection of the cone of which the conical roll surface is a part with said spherical surface. This will produce a true rolling contact between the surfaces E and I, so that the free rotation of the roll is not interfered with.

To render the bearing self centering, I preferably form reverse spherical surfaces L upon the rolls D, extending into grooves K between the heads F and the conical bearing portion. These surfaces J are tangent to a surface J on the member B, the point of tangency being in the circle of projection of the conical surface on the surface J. Thus any lateral stress upon the rotatable member in relation to the non-rotatable member will be resisted by the contacting surfaces J and L, as well as by the surfaces E and I, so as to maintain the relatively rotatable members always concentric. If desired each of the members C and B may be provided with both surfaces E and J, as indicated at the left of Fig. 1.

What I claim as my invention is:

1. The combination with relatively rotatable members having opposed conical surfaces converging to a common point in the axis of rotation, of a series of conical rolls concentrically and radially arranged between said surfaces, a head at the large end of each roll having a spherical surface extending transverse to the cone of which the conical bearing surface is a part and upon opposite sides of the intersection of said cone with said spherical surface, one of said rotatable members having a surface arranged to be tangent to said spherical surface at a point in said intersection, said surfaces being symmetrical upon opposite sides of said intersection.

2. The combination with relatively rotatable members, having opposed conical surfaces converging to a common point in the axis of rotation, of conical rolls arranged concentrically and extending radially between said surfaces, a head at the large end of each roll having a spherical surface transverse to the cone of which the conical roll surface is a part, said head engaging grooves or cut-away portions in said relatively rotatable members, one of said members having a surface arranged tangent to said spherical surface at a point in the intersection of said cone with said spherical surface, the opposite end of said roll head having an opposed spherical surface, and the other of said relatively rotatable members having a surface tangent to said last-mentioned spherical surface at a point in the intersection of said cone with said last-mentioned spherical surface.

3. A roller thrust bearing comprising a rotatable shaft, an outwardly extending head or flange upon said shaft having a conical surface converging to a point in the axis of rotation, an annular bearing surrounding said shaft having a conical surface converging to the same point in the axis of rotation, conical rolls concentrically and radially arranged between said conical surfaces, a head at the outer end of each roll separated from the conical portion thereof by a groove and neck of reduced diameter, the outer and inner ends of said head being provided with spherical surfaces, and coöperating surfaces upon said relatively movable members arranged to be tangent to said spherical surfaces at points in the intersection of the cone of which the conical roll surface is a part with said spherical surfaces.

4. The combination with a rotatable shaft, of an outwardly extending head or flange thereon, having a conical surface converging to a point in the axis of said shaft, an annular bearing surrounding said shaft and having a corresponding conical surface converging to the same point in the axis of the shaft, conical rolls arranged concentrically about and extending radially from the axis of the shaft between said conical surfaces, an enlarged head at the outer end of each roll engaging grooves or cut-away portions in said rotatable head or flange and annular bearing member, said heads having on their outer and inner ends spherical surfaces, and surfaces upon said rotatable head or flange and annular bearing member tangent to said spherical surfaces at points in the intersection of the cone of which the conical roll surface is a part with said spherical surfaces.

5. The combination with a rotatable shaft, of an outwardly-extending head or flange thereon having a conical surface projecting to a point in the axis of said shaft, an annular bearing surrounding said shaft and having a corresponding conical surface converging to the same point in the axis of the shaft, conical rolls arranged concentrically about and extending radially from the axis of the shaft between said conical surfaces, an enlarged head at the large end of said rolls, said head having on its inner and outer ends spherical surfaces, and surfaces upon said rotatable head and annular bearing member tangent to said spherical surfaces at points in the intersection of the cone of which the conical roll surface is a part, with said spherical surfaces.

In testimony whereof I affix my signature in presence of two witnesses.

HENRY L. BOCK.

Witnesses:
James P. Barry,
H. E. Bowman.